(12) United States Patent
Mishima et al.

(10) Patent No.: US 11,591,042 B2
(45) Date of Patent: Feb. 28, 2023

(54) POWER SUPPLY DEVICE FOR HUMAN-POWERED VEHICLE

(71) Applicant: Shimano Inc., Osaka (JP)

(72) Inventors: Eiji Mishima, Osaka (JP); Ryo Yamazaki, Osaka (JP); Norihisa Senoo, Osaka (JP)

(73) Assignee: Shimano Inc., Osaka (JP)

( * ) Notice: Subject to any disclaimer, the term of this patent is extended or adjusted under 35 U.S.C. 154(b) by 662 days.

(21) Appl. No.: 16/567,403

(22) Filed: Sep. 11, 2019

(65) Prior Publication Data

US 2021/0070393 A1    Mar. 11, 2021

(51) Int. Cl.
| | |
|---|---|
| *B62M 6/90* | (2010.01) |
| *B62J 45/20* | (2020.01) |
| *H01R 25/00* | (2006.01) |
| *H01R 13/642* | (2006.01) |
| *B62J 99/00* | (2020.01) |
| *B62J 50/20* | (2020.01) |

(52) U.S. Cl.
CPC ............... *B62M 6/90* (2013.01); *B62J 99/00* (2013.01); *H01R 13/642* (2013.01); *H01R 25/006* (2013.01); *B62J 45/20* (2020.02); *B62J 50/20* (2020.02); *H01R 2201/26* (2013.01)

(58) Field of Classification Search
CPC ... B62M 6/90; B62J 99/00; B62J 45/20; B62J 50/20; B62J 43/00; B62J 45/00; B62J 43/30; H01R 13/642; H01R 25/006; H01R 2201/26
See application file for complete search history.

(56) References Cited

U.S. PATENT DOCUMENTS

| | | | |
|---|---|---|---|
| 8,459,682 B2 | 6/2013 | Calfee | |
| 10,442,488 B2 | 10/2019 | Kakinoki | |
| 2012/0086183 A1* | 4/2012 | Ken ...................... | B60C 19/122 310/67 A |
| 2013/0244463 A1* | 9/2013 | Talavasek .............. | H01R 31/02 280/281.1 |
| 2014/0191493 A1* | 7/2014 | Dal Pozzo ............. | B62K 19/30 280/288.4 |
| 2015/0028668 A1* | 1/2015 | Smith .................... | B62K 19/30 280/288.4 |

(Continued)

FOREIGN PATENT DOCUMENTS

CN         106985948 A      7/2017

OTHER PUBLICATIONS

Shimano, Ultegra R8050 Series Dealer's Manual, Sep. 2017, pp. 1, 24, 25, 62, 69,109-121 and 169.

*Primary Examiner* — Lincoln D Donovan
*Assistant Examiner* — Alex W Lam
(74) *Attorney, Agent, or Firm* — Global IP Counselors, LLP

(57) ABSTRACT

A power supply device is provided for a human-powered vehicle. The power supply device comprises a base, a first electrical port, a second electrical port and a third electrical port. The first electrical port is provided to the base. The first electrical port has a first connection configuration. The second electrical port is provided to the base, and having a second connection configuration. The third electrical port is provided to the base, and having a third connection configuration. The first connection configuration, the second connection configuration and the third connection configuration have a same shape.

20 Claims, 11 Drawing Sheets

(56) References Cited

U.S. PATENT DOCUMENTS

| | | | |
|---|---|---|---|
| 2015/0073656 A1* | 3/2015 | Takamoto | G06F 9/02 |
| | | | 701/1 |
| 2016/0153515 A1 | 6/2016 | Ebersbach et al. | |
| 2017/0057595 A1 | 3/2017 | Peng | |
| 2018/0186419 A1* | 7/2018 | Shipman | B62K 19/36 |

* cited by examiner

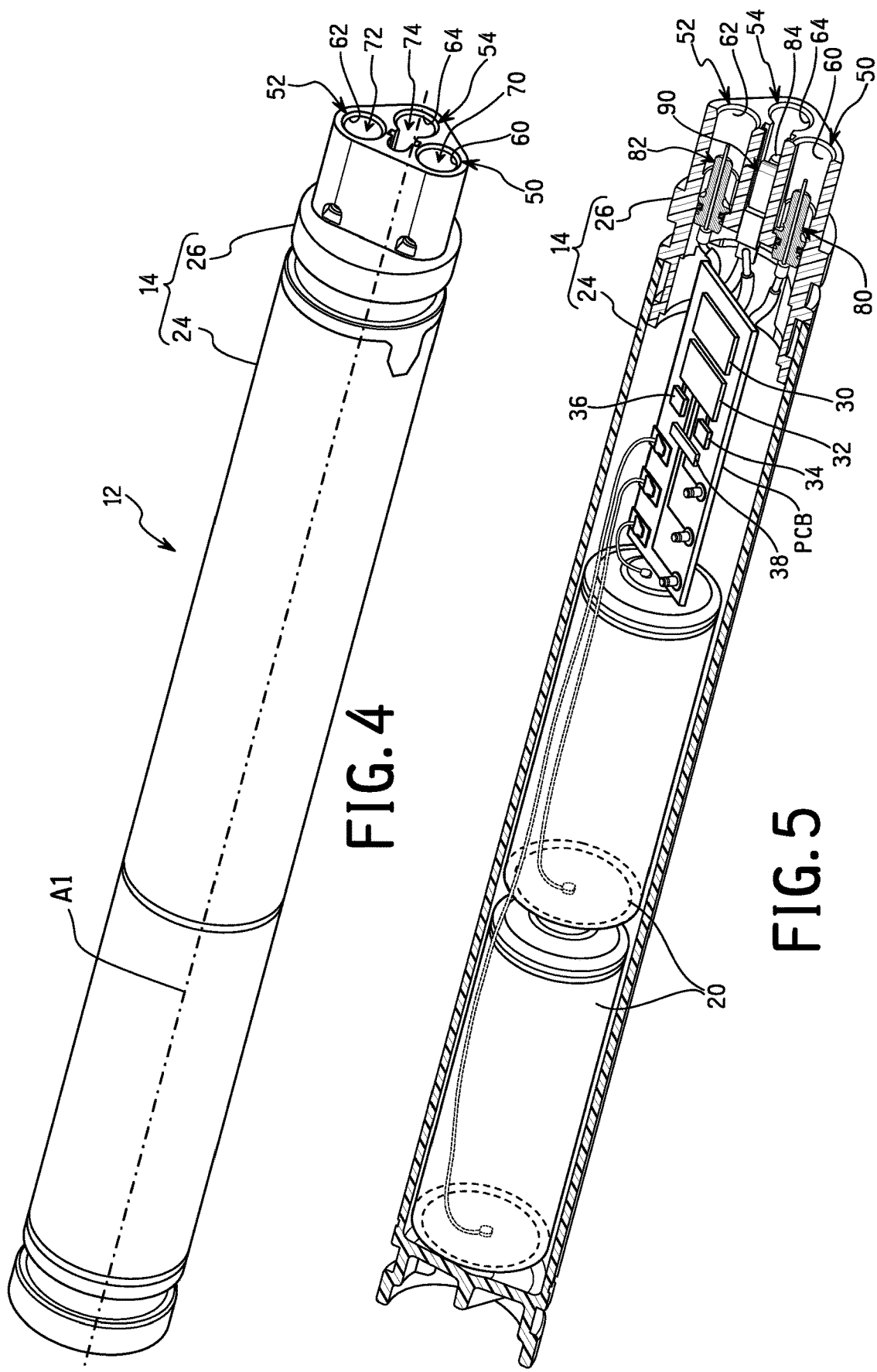

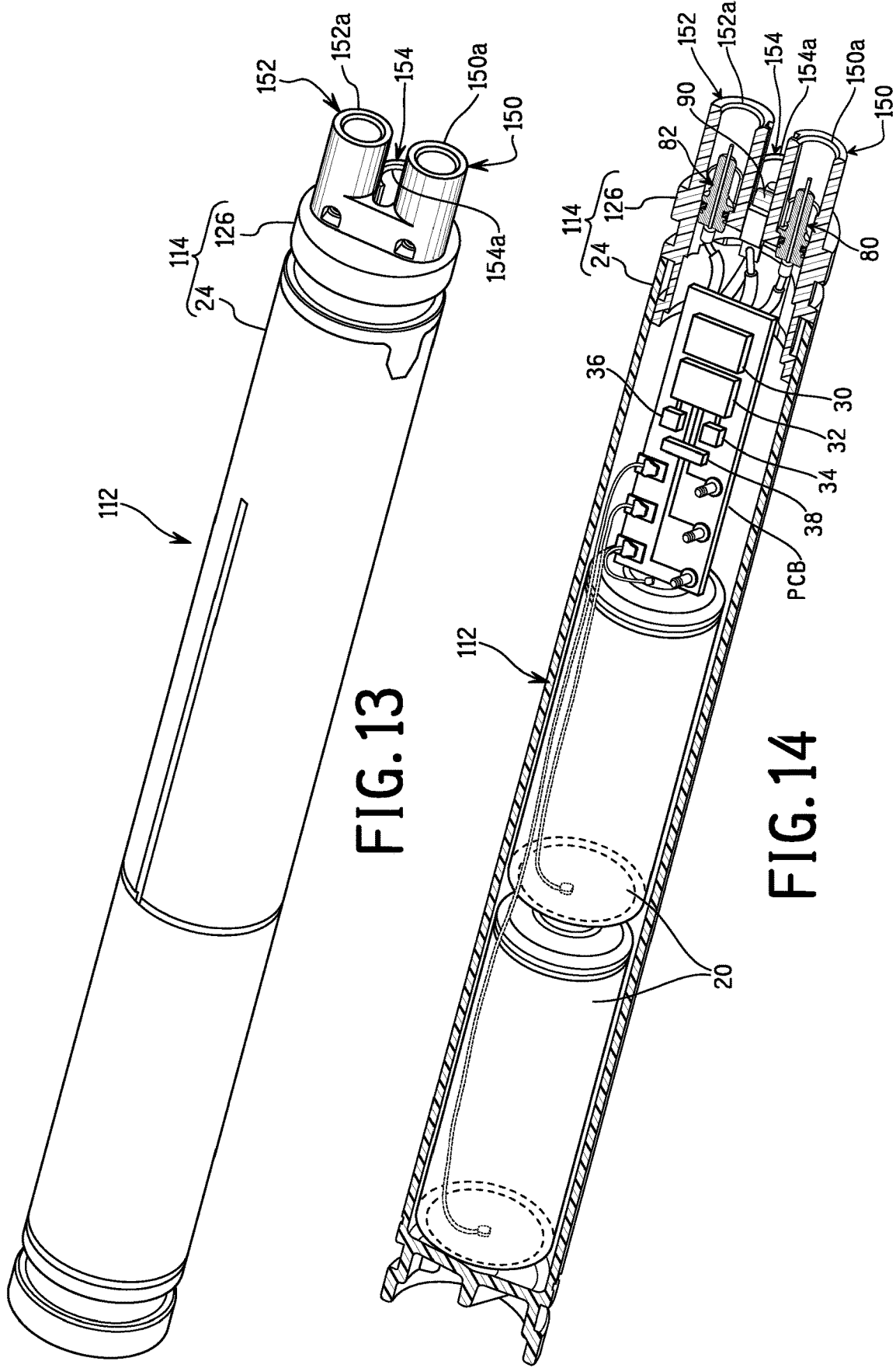

POWER SUPPLY DEVICE FOR HUMAN-POWERED VEHICLE

BACKGROUND

Technical Field

This disclosure generally relates to a power supply device for a human-powered vehicle. The power supply device is configured to supply electrical power to one or more electric components.

Background Information

In recent years, some human-powered vehicles (e.g., bicycles) are provided with electric components or devices to make it easier for the rider to operate the human-powered vehicles. Examples of such electric components include suspensions, transmission devices (e.g., derailleurs, internally geared hubs, etc.), operating devices and seatposts. Such electric components use electricity from an onboard power source, such as a battery. Typically, the power source (e.g., the battery) connected by an electrical cable to a junction box which is connected to two or more electric components via electrical cables.

SUMMARY

Generally, the present disclosure is directed to various features of a power supply device for a human-powered vehicle. The power supply device is configured to supply electrical power to one or more electric components.

In view of the state of the known technology and in accordance with a first aspect of the present disclosure, a power supply device is provided for a human-powered vehicle. The power supply device basically comprises a base, a first electrical port, a second electrical port and a third electrical port. The first electrical port is provided to the base. The first electrical port has a first connection configuration. The second electrical port is provided to the base. The second electrical port has a second connection configuration. The third electrical port is provided to the base. The third electrical port has a third connection configuration. The first connection configuration, the second connection configuration, and the third connection configuration have a same shape.

With the power supply device according to the first aspect, it is possible to connect the power supply device to a plurality of electric components without a junction box electrically connecting the power supply device and the electric components.

In accordance with a second aspect of the present disclosure, the power supply device according to the first aspect further comprises a battery and an electronic controller. The battery is provided to the base. The electronic controller is provided to the base and operatively connected to the battery.

With the power supply device according to the second aspect, it is possible to transmit electrical signals over the power lines between at least two electric components.

In accordance with a third aspect of the present disclosure, the power supply device according to the second aspect is configured so that further comprises an operating member. The electronic controller is configured to be rebooted to a predetermined setting upon the operating member being operated.

With the power supply device according to the third aspect, it is possible to manually reset a predetermined setting.

In accordance with a fourth aspect of the present disclosure, the power supply device according to the third aspect is configured so that the operating member is movably attached to the third electrical port.

With the power supply device according to the fourth aspect, it is possible for a rider or user to easily reset a predetermined setting in response to operation of the operating member.

In accordance with a fifth aspect of the present disclosure, the power supply device according to the fourth aspect is configured so that the operating member has a connector configured to selectively mate with the first electrical port, the second electrical port, and the third electrical port.

With the power supply device according to the fifth aspect, it is possible to selectively couple the operating member to any one of the first, second and third electrical ports.

In accordance with a sixth aspect of the present disclosure, the power supply device according to the fourth aspect is configured so that the operating member is remotely arranged from the base.

With the power supply device according to the sixth aspect, it is possible to remotely reset a predetermined setting.

In accordance with a seventh aspect of the present disclosure, the power supply device according to any one of the first to sixth aspects is configured so that the base is configured to be arranged in at least one of a seatpost and an internal space of the human-powered vehicle.

With the power supply device according to the seventh aspect, it is possible to conceal and protect the power supply device.

In accordance with an eighth aspect of the present disclosure, the power supply device according to any one of the first to seventh aspects is configured so that the base includes a housing having a pillar shape.

With the power supply device according to the eighth aspect, it is possible to appropriately arrange the power supply device on the human-powered vehicle.

In accordance with a ninth aspect of the present disclosure, the power supply device according to any one of the first to eighth aspects is configured so that the first electrical port, the second electrical port, and the third electrical port extend from the base in a first direction that is parallel to a longitudinal direction of the base.

With the power supply device according to the ninth aspect, it is possible to appropriately arrange electrical cables that are connected to the first, second and third electrical ports of the power supply device.

In accordance with a tenth aspect of the present disclosure, the power supply device according to the ninth aspect is configured so that further comprises a discrimination structure that is configured to discriminate the third electrical port from the first electrical port and the second electrical port.

With the power supply device according to the tenth aspect, it is possible to easily distinguish the third electrical port from the first electrical port and the second electrical port.

In accordance with an eleventh aspect of the present disclosure, the power supply device according to the tenth aspect is configured so that the first electrical port has a first distal end, the second electrical port has a second distal end, and the third electrical port has a third distal end. The third distal end is offset from the first and second distal ends as viewed in a second direction that is perpendicular to the longitudinal direction of the base. The discrimination structure includes a step defined by the third distal end and the first and second distal ends.

With the power supply device according to the eleventh aspect, it is possible to easily distinguish the third electrical port from the first electrical port and the second electrical port.

In accordance with a twelfth aspect of the present disclosure, the power supply device according to any one of the first to eleventh aspects is configured so that each of the first electrical port, the second electrical port, and the third electrical port has a receiving bore with a cylindrical shape.

With the power supply device according to the twelfth aspect, it is possible to use cylindrical electrical connectors with the power supply device.

In accordance with a thirteenth aspect of the present disclosure, the power supply device according to the twelfth aspect is configured so that each of the receiving bores of the first electrical port, the second electrical port, and the third electrical port has a center axis that corresponds to a vertex of a triangle when viewed from a first direction that is parallel to a longitudinal direction of the base.

With the power supply device according to the thirteenth aspect, it is possible to compactly arranged electrical cables that are connected to the first, second and third electrical ports of the power supply device.

In accordance with a fourteenth aspect of the present disclosure, the power supply device according to the thirteenth aspect is configured so that the triangle includes a first side, a second side, and third side. The first side and the second side have lengths that are equal.

With the power supply device according to the fourteenth aspect, it is possible to compactly arranged electrical cables that are connected to the first, second and third electrical ports of the power supply device.

In accordance with a fifteenth aspect of the present disclosure, the power supply device according to the fourteenth aspect is configured so that the third side has a length that is different from the length of the first side.

With the power supply device according to the fifteenth aspect, it is possible to compactly arranged electrical cables that are connected to the first, second and third electrical ports of the power supply device.

In accordance with a sixteenth aspect of the present disclosure, the power supply device according to any one of the twelfth to fifteenth aspects is configured so that the first electrical port has a first receiving bore that is dimensioned to receive a first electrical cable having a first maximum diameter. The second electrical port has a second receiving bore that is dimensioned to receive a second electrical cable having a second maximum diameter. The third electrical port has a third receiving bore that is dimensioned to receive a third electrical cable having a third maximum diameter. The first maximum diameter, the second maximum diameter, and the third maximum diameter are equal.

With the power supply device according to the sixteenth aspect, it is possible to connect similarly sized electrical cables to the first, second and third electrical ports of the power supply device.

In accordance with a seventeenth aspect of the present disclosure, the power supply device according to any one of the first to sixteenth aspects further comprises an indicator that is configured to indicate information regarding the power supply device.

With the power supply device according to the seventeenth aspect, it is possible to easily determine the remaining amount of battery charge.

In accordance with an eighteenth aspect of the present disclosure, the power supply device according to any one of the first to seventeenth aspects further comprises a communicator that is configured to output information regarding the power supply device.

With the power supply device according to the eighteenth aspect, it is possible to provide information regarding the power supply device to the rider or user on a remote indicator (e.g., a display or speaker).

In accordance with a nineteenth aspect of the present disclosure, the power supply device according to the eighteenth aspect is configured so that the communicator includes a wireless communication device configured to wirelessly output information regarding the power supply device.

With the power supply device according to the nineteenth aspect, it is possible to eliminate wiring between the power supply device and a remote indicator (e.g., a display or speaker).

In accordance with a twentieth aspect of the present disclosure, the power supply device according to the any one of the seventeenth to nineteenth aspects is configured so that the information including an operational state of the power supply device and an electrical supply capacity of the power supply device.

With the power supply device according to the twentieth aspect, it is possible to easily determine the operational state of the power supply device and an electrical supply capacity of the power supply device.

Also, other objects, features, aspects and advantages of the disclosed power supply device will become apparent to those skilled in the art from the following detailed description, which, taken in conjunction with the annexed drawings, discloses preferred embodiments of the power supply device.

BRIEF DESCRIPTION OF THE DRAWINGS

Referring now to the attached drawings which form a part of this original disclosure:

FIG. 4 is a perspective view of the power supply device of the first embodiment;

FIG. 5 is a cross sectional view of the power supply device illustrated in FIG. 4;

FIG. 13 is a perspective view of the power supply device in accordance with a second embodiment;

FIG. 14 is a cross sectional view of the power supply device illustrated in FIG. 13.

DETAILED DESCRIPTION OF EMBODIMENTS

Selected embodiments will now be explained with reference to the drawings. It will be apparent to those skilled in the human-powered vehicle field from this disclosure that the following descriptions of the embodiments are provided for illustration only and not for the purpose of limiting the invention as defined by the appended claims and their equivalents.

Figure 1:
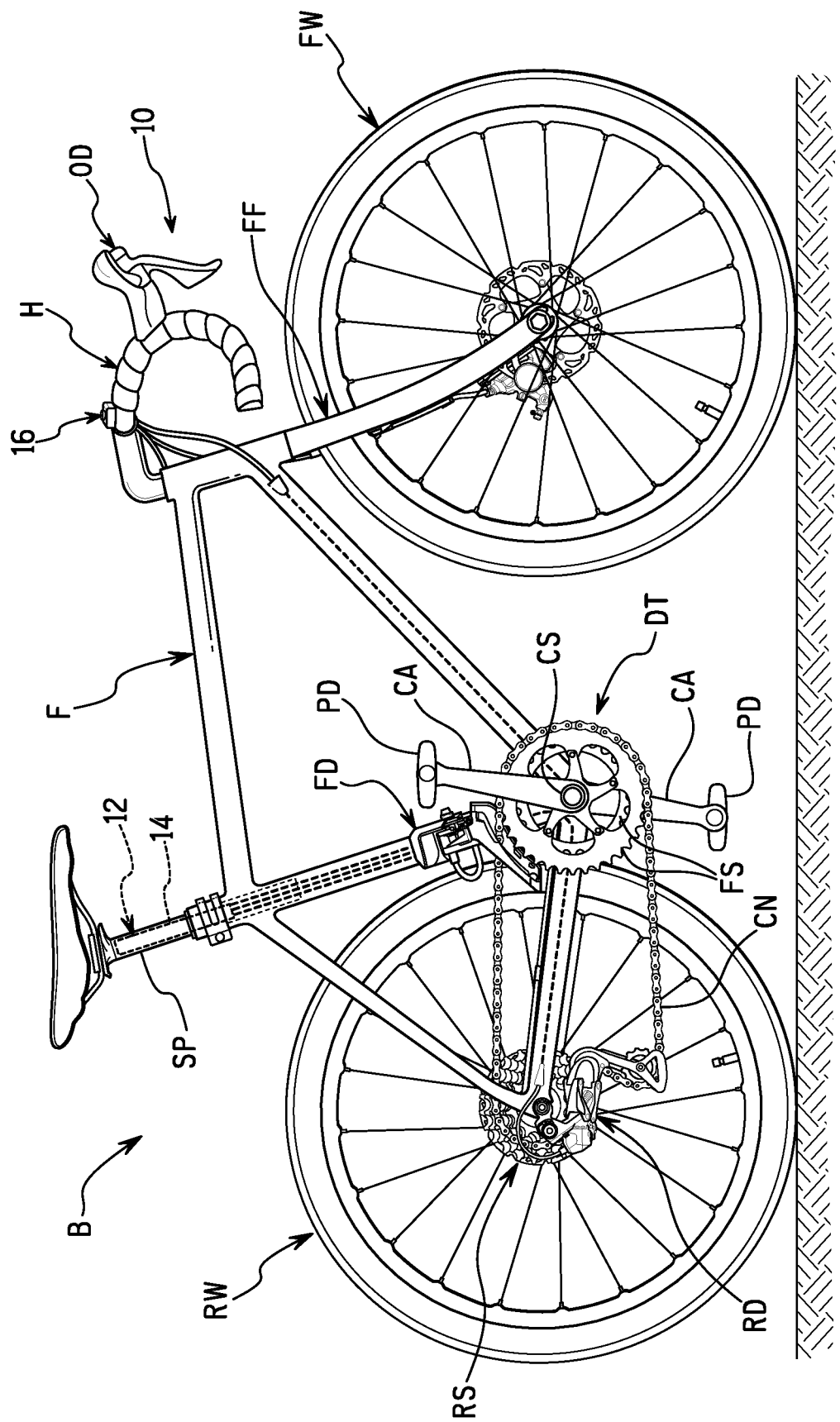
FIG. 1 is a side elevational view of a bicycle equipped with a power supply device that provides electrical power to electric components (a front derailleur and a rear derailleur) in accordance with a first embodiment.

Referring initially to FIG. 1, a human-powered vehicle B is illustrated that is used in the illustrated embodiments. The human-powered vehicle B is equipped with an electric shifting system 10 in accordance with the illustrated embodiments. The term "human-powered vehicle" as used herein refers to a vehicle that can be driven by at least human driving force, but does not include a vehicle using only a driving power other than human power. In particular, a vehicle solely using an internal combustion engine as a driving power is not included in the human-powered vehicle. The human-powered vehicle is generally assumed to be a compact, light vehicle that does not require a license for driving on a public road. The number of wheels on the human-powered vehicle B is not limited. The human-powered vehicle B includes, for example, a monocycle and a vehicle having three or more wheels. The human-powered vehicle B includes, for example, various types of bicycles such as a mountain bike, a road bike, a city bike, a cargo bike, and a recumbent bike, and an electric assist bicycle (E-bike). In the embodiments described below, the human-powered vehicle B refers to a bicycle.

As seen in FIG. 1, the human-powered vehicle B is a multi-purpose road bike or gravel bike, but the human-powered vehicle B is not limited to being used with this kind of road bikes. The human-powered vehicle B basically includes a frame F, a front fork FF, a front wheel FW, a rear wheel RW, a handlebar H and a drivetrain DT. The drivetrain DT basically include a crankshaft CS, a pair of crank arms CA, a pair of pedals PD, a plurality of front sprockets FS, a plurality of rear sprockets RS and a chain CN. The crank arms CA are mounted at opposite ends of the crankshaft CS. Each of the pedals PD is rotatably coupled to the distal end of a corresponding one of the crank arms CA. The front sprockets FS are arranged on one of the crank arms CA. The rear sprockets RS are arranged on a rear hub of the rear wheel RW. In the first embodiment, the chain CN runs around drivetrain DT the front sprockets FS and one of the rear sprockets RS. A driving force applied by the rider of the human-powered vehicle B to the pedals PD is transmitted to the rear wheel RW via the front sprockets FS, the chain CN, and the rear sprockets RS. Optionally, the human-powered vehicle B can include an electric drive unit to assist the driving force of the rider. Namely, the human-powered vehicle B can be an e-bike.

Here, the human-powered vehicle B further includes an electric rear derailleur RD for shifting the chain CN between the rear sprockets RS and an electric front derailleur FD for shifting the chain CN between the front sprockets FS. The rear derailleur RD and the front derailleur FD are each operated by a user operating device OD. While the user operating device OD is illustrated for controlling both of the rear derailleur RD and the front derailleur FD, it will be apparent from this disclosure that each of the rear derailleur RD and front derailleur FD can be controlled by a separate user operating device. Here, the user operating device OD is an electric shifter with a hydraulic braking function. The rear derailleur RD and the front derailleur FD are examples of vehicle components, amore specifically examples of electric bicycle components.

Figure 2:
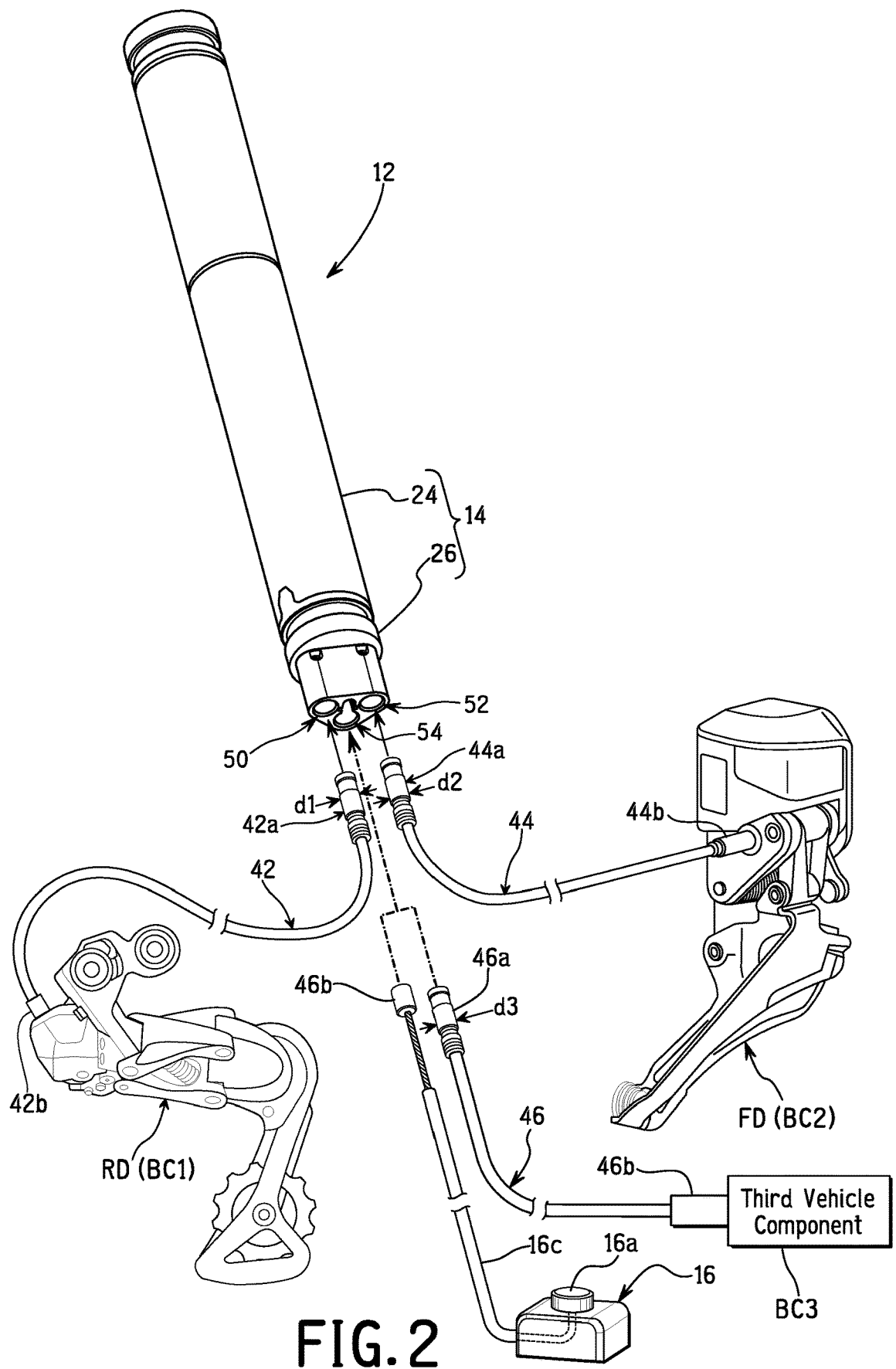
FIG. 2 is a simplified wiring diagram illustrating the power supply device being electrically coupled to the front derailleur and the rear derailleur.

As seen in FIGS. 1 and 2, a power supply device 12 is provided for the human-powered vehicle B in accordance with a first embodiment. Basically, the power supply device 12 comprises a base 14. Preferably, as seen in FIG. 1, the base 14 is configured to be arranged in at least one of a seatpost SP and an internal space of the human-powered vehicle B. Here, the base 14 of the power supply device 12 is disposed in the seatpost SP of the human-powered vehicle B as seen in FIG. 1. However, the base 14 of the power supply device 12 is shaped such that the base 14 of the power supply device 12 can be disposed in an internal space of the frame F of the human-powered vehicle B.

Figure 3:
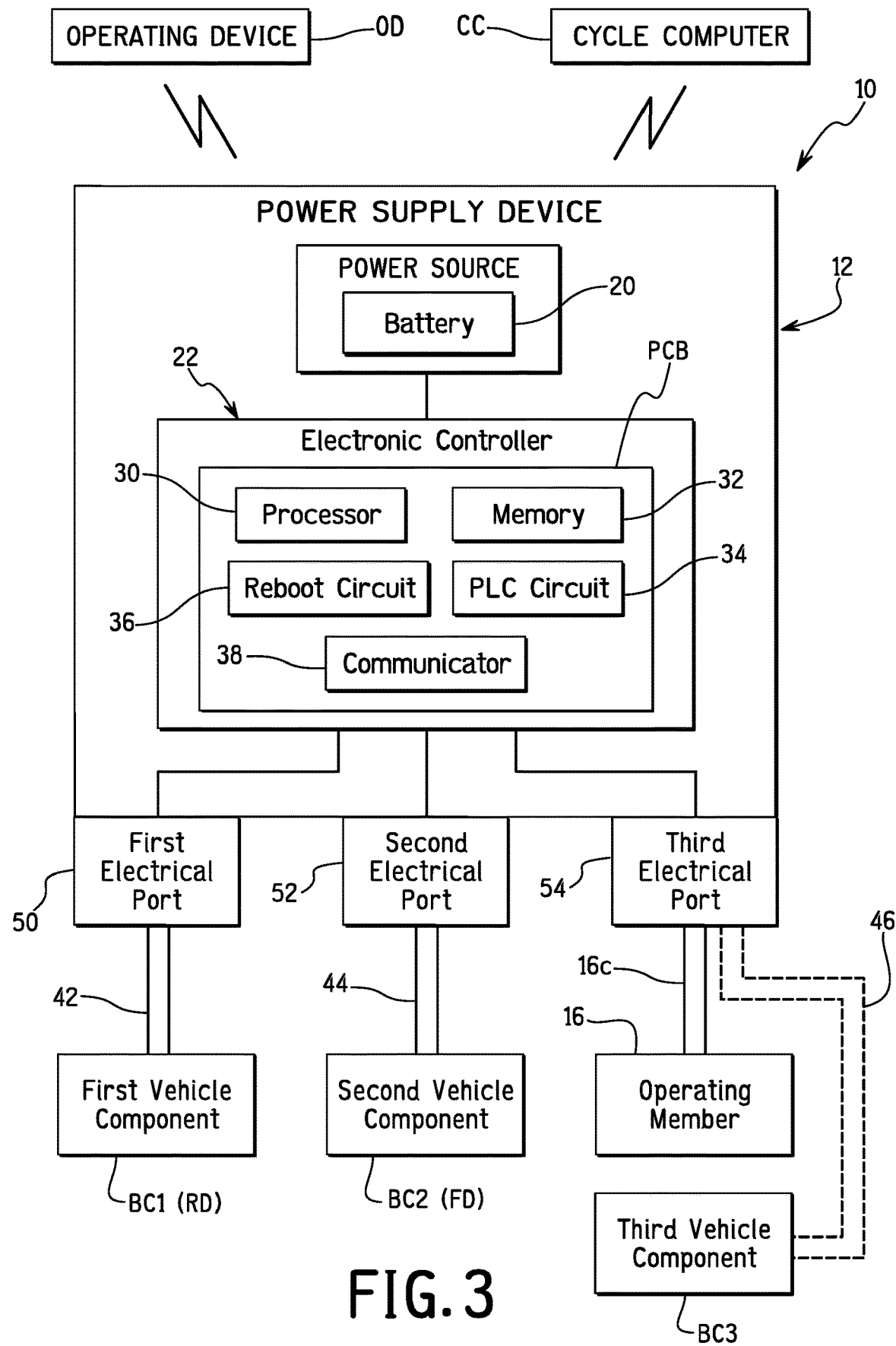
FIG. 3 is a simplified block diagram of an electric shifting system that includes the power supply device illustrated in FIGS. 1 and 2.

As seen in FIG. 3, the power supply device 12, the operating device OD, the rear derailleur RD and the front derailleur FD are parts of the electric shifting system 10. The user operating device OD can communicate with the rear derailleur RD and the front derailleur FD using either wireless communications or wired communications. Here, the operating device OD is a bicycle shifter that wirelessly communicates with the power supply device 12 via the power supply device 12 as explained below. However, the user operating device OD can connected by an electrical cable to the power supply device 12 for controlling the gear shifting of the rear derailleur RD and the front derailleur FD.

In the first embodiment, the power supply device 12 further comprises an operating member 16. Here, the operating member 16 is remotely arranged from the base 14. For example, the operating member 16 is provided on the handlebar H as seen in FIG. 1. The operating member 16 includes a user input 16a (push button) that is manually operated by a rider or user. However, the operating member 16 is not limited to the illustrated embodiment (i.e., a push type operating member). For example, the operating member 16 can be a rotary type operating member or a pull type operating member. Also, alternatively, the operating member 16 can be an electrical operating member instead of a mechanical operating member as illustrated herein. Here, as explained below, the operating member 16 is used for rebooting certain programs, settings, parameters, etc. However, in certain situations, the operating member 16 can be omitted as explained below.

Figure 8:
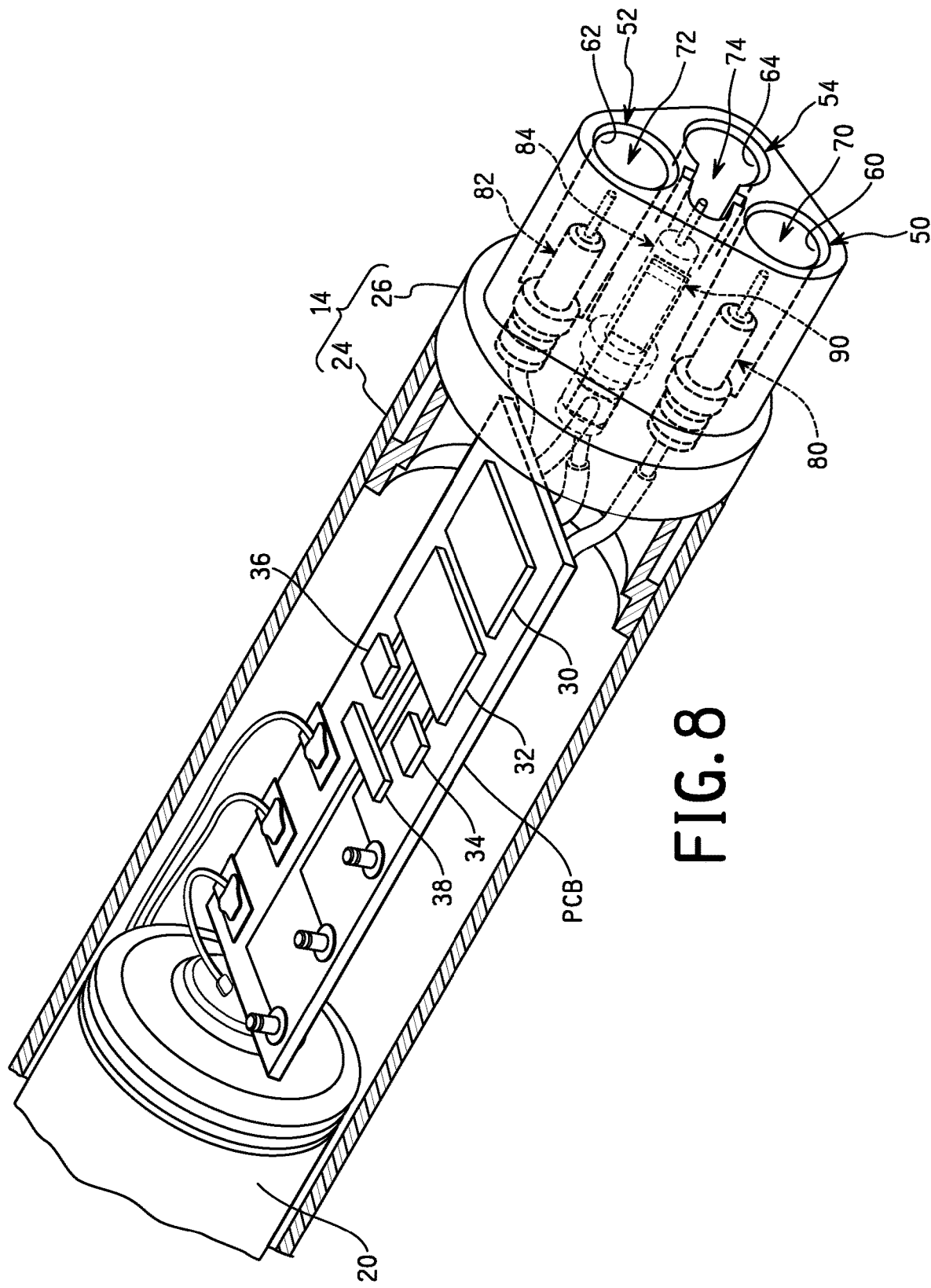
FIG. 8 is an enlarged partial perspective view of the connection end of the power supply device illustrated in FIGS. 4 to 7 with a portion of the housing broken away.

Referring to FIGS. 3, 5 and 8, the power supply device 12 further comprises a battery 20 and an electronic controller 22. The battery 20 is provided to the base 14. Here, the electronic controller 22 is also provided to the base 14. The electronic controller 22 is operatively connected to the battery 20. In this way, electrical power from the battery 20 can be distributed to one or more electric components of the human-powered vehicle B. Also, the electronic controller 22 is used to control each electric component (e.g. the rear and front derailleurs RD and FD that is plugged into the power supply device 12 as explained below.

Preferably, the base 14 includes a housing 24 that has a pillar shape. The term "pillar shape" has used herein refers an elongated structure (e.g., a column, a post, or a pole) that has an outer surface with a circular cross section, a polygonal cross section, or a rounded polygonal cross section (e.g., a rounded rectangular). In any case, here, the housing 24 is tubular having a hollow interior with one end being open and the other end closed. The battery 20 and the electronic controller 22 are provided inside the housing 24. The base 14 further includes an end cap 26 that is attached to the open end of the housing 24 to thereby is closed off by the open end of the housing 24. The end cap 26 is bonded to the housing 24 by an adhesive, weld, or other suitable fastener. The end cap 26 can be detachably attached to the housing 24 by a suitable connection (e.g., a threaded connection, a bayonet connection, etc.) if needed and/or desired. Preferably, the housing 24 and the end cap 26 form a waterproof enclosure. The housing 24 and the end cap 26 are preferably constructed of a hard plastic.

The battery 20 is an example of an electrical power source for providing electrical power to one or more electric components of the human-powered vehicle B. The battery 20 is preferably a rechargeable battery having one or more cells. For example, the battery 18 can be a lithium-ion battery. However, other types of electrical power source device can be used in place of the battery 18. For example, the battery 18 can be replaced with electrical power source devices such as a hydrogen powered fuel cell or a capacitor.

The electronic controller 22 is preferably a microcomputer or central processing unit (CPU) that includes at least one processor 30 and at least one computer storage devices or memory 32. The electronic controller 22 is formed of one or more semiconductor chips that are mounted on a circuit board PCB. The term "electronic controller" as used herein refers to hardware that executes a software program, and does not include a human.

Although illustrated as separate elements in FIG. 3, those skill in the art will recognize that one or more components may comprise, or include one or more circuit boards containing any number of integrated circuit or circuits for completing the activities described herein. The electronic controller 22 can be one or more integrated circuits having firmware for causing the circuitry to complete the activities described herein. Of course, any number of other analog and/or digital components capable of performing the below described functionality can be provided in place of, or in conjunction with the below described controller elements. Here, as seen in FIG. 3, the processor 30 and the memory 32 are provided on a single circuit board PCB, which is a printed circuit board in the illustrated embodiments.

The memory 32 is configured to store settings, programs, data, calculations and/or results of the processor 30. The memory 32 is any computer storage device or any non-transitory computer-readable medium with the sole exception of a transitory, propagating signal. For example, the memory 32 can include nonvolatile memory and volatile memory, and can includes a ROM (Read Only Memory) device, a RAM (Random Access Memory) device, a hard disk, a flash drive, etc.

Also, the electronic controller 22 further includes a power line communication (PLC) circuit 34 for carrying out power line communications such that electric components can receive both electrical power and data on the same electrical conductor. In other words, power line communication (PLC) carries data on a conductor that is also used simultaneously for electric power transmission or electric power distribution to an electric component. Also, power line communication uses unique identifying information such as a unique identifier that is assigned to each of the electric components.

Also, the electronic controller 22 includes a reset or reboot circuit 36 for rebooting the processor 30 and/or the memory 32. Thus, certain programs, settings, parameters, etc. are rest to a default setting or value. The reboot circuit 36 is activated in response to the operation of the operating member 16. In other words, upon the operating member 16 being operated, the reboot circuit 36 is activated to output a reset or reboot signal to the processor 30 which clears the memory 32 and/or restarts the programs. For example, the reboot signal can cause the processor 30 to execute a program to reboot the processor 30 and/or clear the memory 32 to a predetermined setting. In this way, the electronic controller 22 is configured to be rebooted to a predetermined setting upon the operating member 16 being operated.

In the illustrated embodiments, the power supply device 12 further comprises a communicator 38 that is configured to output information regarding the power supply device 12. Here, the communicator 38 is provided on the circuit board PCB that also includes the electronic controller 22. A communicator is a hardware device capable of transmitting an analog or digital signal over a communication wire, or wirelessly. Examples of communicators include a NIC (network interface card), a Wi-Fi device, and an access point. In the illustrated embodiments, the communicator 38 includes a wireless communication device configured to wirelessly output information regarding the power supply device 12. The terms "wireless communication device" and "wireless communicator" as used herein include a receiver, a transmitter, a transceiver, a transmitter-receiver, and contemplates any device or devices, separate or combined, capable of transmitting and/or receiving wireless communication signals, including shift signals or control, command or other signals related to some function of the component being controlled. The wireless communication signals can be radio frequency (RF) signals having a frequency that is in a 2.4 GHz band, specifically from 2.480 to 2.499 GHz, more specifically from 2.490 to 2.499 GHz, ultra-wide band communication signals, or Bluetooth® communications or any other type of signal suitable for short range wireless communications as understood in the human-powered vehicle field. The communicator 38 can be a one-way wireless communication device such as a transmitter if information only needs to wirelessly outputted. However, in the first embodiment, the communicator 38 is a two-way wireless communication device.

Preferably, the power supply device 12 further comprises an indicator (e.g., a cycle computer CC or a noise generation device provided on the circuit board PCB) that is configured to indicate information regarding the power supply device 12. In the first embodiment, preferably, the information includes, among other things, an operational state of the power supply device 12 and an electrical supply capacity of the power supply device 12. For example, the information from the communicator 38 can be conveyed to a user or rider audibly via a noise generation device (a speaker or a buzzer) provided by the cycle computer CC or visually via a display provided by the cycle computer CC. Alternatively, the information regarding the power supply device 12 can be conveyed to a user or rider audibly via the noise generation device (a speaker or a buzzer) provided on the circuit board PCB. The noise generation device can use different sounds to indicate the operational state of the power supply device 12 and the electrical supply capacity of the power supply device 12. For example, the electrical supply capacity can be the remaining amount of electrical power in the battery 20.

Here, the rear derailleur RD and the front derailleur FD communicates with the user operating device OD using the communicator 38 for wirelessly receiving shift signals and wirelessly transmitting data. Alternatively, for example, each of the rear derailleur RD and the front derailleur FD can include a wireless communicator that is configured to conduct two-way wireless communications with the user operating device OD for wirelessly receiving shift signals and wirelessly transmitting data. The electronic controller 22 is programmed to process signals from an upshift switch of the operating device OD as upshifting signals and to process signals from a downshift switch of the operating device OD as downshifting signals for selectively shifting the rear derailleur RD and the front derailleur based on a prestored synchro-shift table in the memory 32.

Preferably, the communicator 38 can wirelessly communicate with other devices, such as a smart-phone or a personal computer, for updating firmware stored in the memory 32 of the electronic controller 22 or stored in the memory of the rear derailleur RD and/or the front derailleur FD. The wireless control signals of the communicator 38 can transmit the signals at a particular frequency and/or with an identifier such as a particular code, to distinguish the wireless control signal from other wireless control signals. In this way, the rear derailleur RD and the front derailleur FD can recognize which control signals are to be acted upon and which control signals are not to be acted upon. Thus, the rear derailleur RD and the front derailleur FD can ignore the control signals from other wireless communicators.

As seen in FIGS. 2 and 3, the power supply device 12 can be electrically connected to the first vehicle component BC1 (i.e., the rear derailleur RD in this embodiment) via a first electrical cable 42 to provide electrical power to the first vehicle component BC1. Also, the power supply device 12 can be electrically connected to the second vehicle component BC2 (i.e., the front derailleur FD in this embodiment) via a second electrical cable 44 to provide electrical power to the second vehicle component BC2. Here, the first and second electrical cables 42 and 44 also transmit data signals between the power supply device 12 and the first and second vehicle components BC1 and BC2 using power line communications. As seen in FIG. 3, if the operating member 16 is disconnected from the power supply device 12, then the power supply device 12 can be electrically connected to a third vehicle component BC3 (e.g., an electric seatpost, an electric suspension, etc.) via a third electrical cable 46 to provide electrical power to the third vehicle component BC3. Preferably, each of the first, second and third electrical cables 42, 42 and 46 has a rated ampacity which is larger than 1.0 ampere and smaller than 3.5 amperes. Here, each of the first, second and third electrical cables 42, 42 and 46 has a rated ampacity of 3.0 amperes. Preferably, each of the first, second and third electrical cables 42, 42 and 46 has a rated voltage which is larger than 8.4 volts and smaller than 35 volts. Here, each of the first, second and third electrical cables 42, 42 and 46 has a rated voltage of 30 volts.

Figure 6:
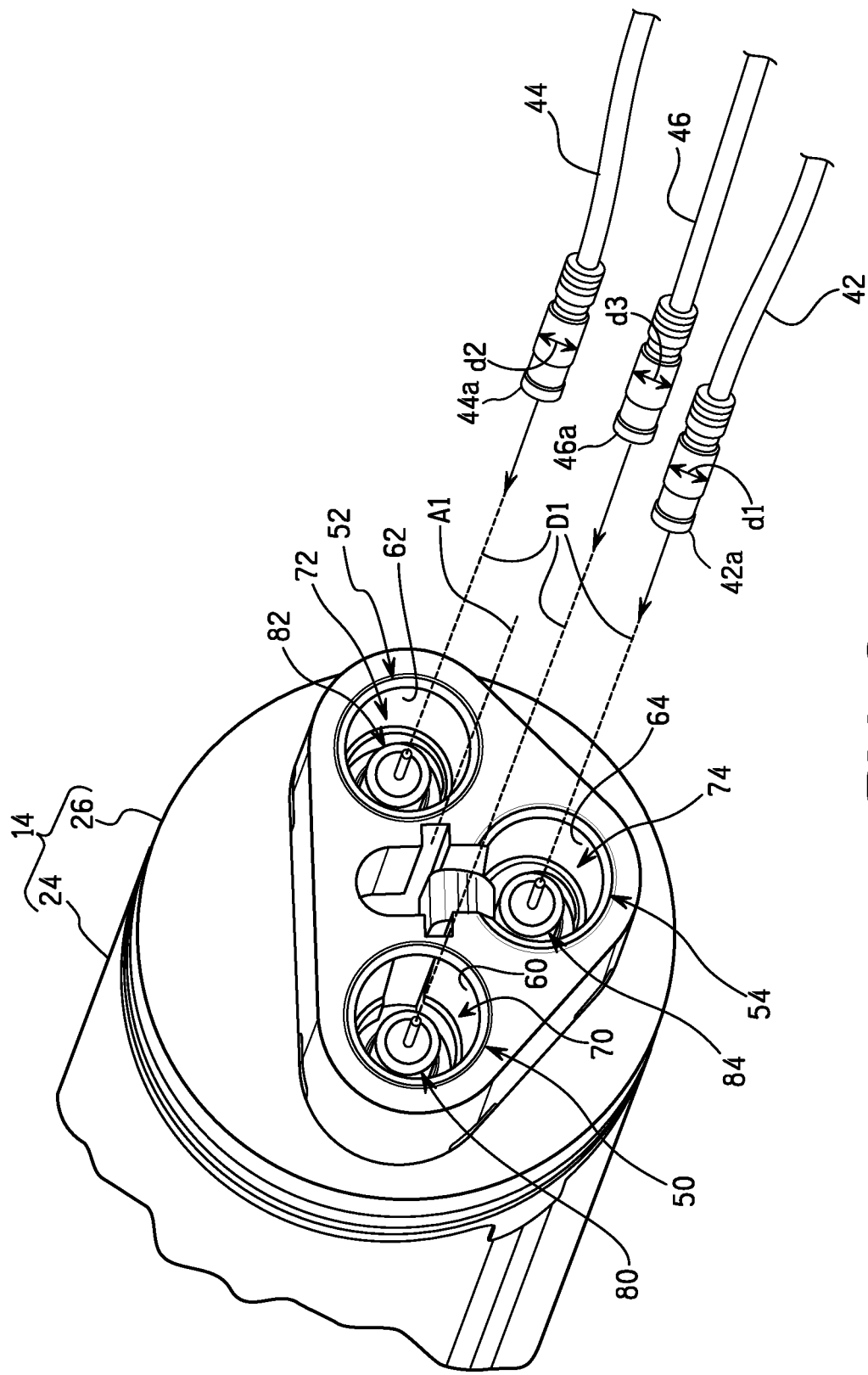
FIG. 6 is a partial perspective view of a connection end of the power supply device illustrated in FIGS. 4 and 5.

As seen in FIGS. 4 to 10, in the first embodiment, the power supply device 12 further comprises a first electrical port 50, a second electrical port 52 and a third electrical port 54. The first electrical port 50 is provided to the base 14. The second electrical port 52 is provided to the base 14. The third electrical port 54 is provided to the base 14. In particular, the first electrical port 50, the second electrical port 52 and the third electrical port 54 are integrally formed with the end cap 26. However, the first electrical port 50, the second electrical port 52 and the third electrical port 54 can be attached to the base 14 separately or as a unit. As seen in FIG. 6, the first electrical port 50, the second electrical port 52, and the third electrical port 54 extend from the base 14 in a first direction D1 that is parallel to a longitudinal direction μl of the base 14.

The first electrical port 50 has a first receiving bore 60 with a cylindrical shape. The second electrical port 52 has a second receiving bore 62 with a cylindrical shape. The third electrical port 54 has a third receiving bore 64 with a cylindrical shape. In other words, each of the first electrical port 50, the second electrical port 52, and the third electrical port 54 has the receiving bore 60, 62, or 64 with a cylindrical shape. More particularly, the third receiving bore 64 has a spilt cylinder shape, while the first and second receiving bores 60 and 62 have a continuous cylinder shape. A centrally located bore 66 is located between the first and second receiving bores 60 and 62. The bore 66 is longitudinally connected with the third receiving bore 64 such that the bore 66 communicates with the third receiving bore 64.

The first receiving bore 60 is dimensioned to receive the first electrical cable 42 having a first maximum diameter d1 FIGS. 2 and 6. Here, the first electrical cable 42 is provided with a first electrical connector 42a at one end and a second electrical connector 42b at the other end. The first maximum diameter d1 of the first electrical cable 42 is defined by the first electrical connector 42a. The first and second electrical connectors 42a and 42b can be identical or different. The second receiving bore 62 is dimensioned to receive a second electrical cable 44 having a second maximum diameter d2 as seen in FIGS. 2 and 6. Here, the second electrical cable 44 is provided with a first electrical connector 44a at one end and a second electrical connector 44b at the other end. The second maximum diameter d2 of the second electrical cable 44 is defined by the first electrical connector 44a. The first and second electrical connectors 44a and 44b can be identical or different. The third receiving bore 64 is dimensioned to receive the third electrical cable 46 having a third maximum diameter d3 as seen in FIGS. 2 and 6. Here, the third electrical cable 46 is provided with a first electrical connector 46a at one end and a second electrical connector 46b at the other end. The third maximum diameter d3 of the third electrical cable 46 is defined by the first electrical connector 46a. The first and second electrical connectors 46a and 46b can be identical or different. The first maximum diameter d1, the second maximum diameter d2, and the third maximum diameter d3 are equal. Preferably, each of the first, second and third receiving bores 60, 62 and 64 has a maximum diameter which is smaller than five millimeters. Preferably, the maximum diameters of the first, second and third receiving bores 60, 62 and 64 are larger than 2.5 millimeters and preferably smaller than 3.5 millimeters. Here the maximum diameter of each of the first, second and third receiving bores 60, 62 and 64 is three millimeters.

Here, the first electrical connectors 42a, 44a and 46a of the first, second and third electrical cables 42, 44 and 46 are each electrically connected to one of the first, second and third electrical ports 50, 52 and 54, while the second electrical connectors 42b, 44b and 46b of the first, second and third electrical cables 42, 44 and 46 are each electrically connected to a different electric component. However, the second electrical connectors 42b, 44b and 46b of the first, second and third electrical cables 42, 44 and 46 can be all connected to the same electric component. Likewise, two of the second electrical connectors 42b, 44b and 46b of the first, second and third electrical cables 42, 44 and 46 can be connected to the same electric component.

The first electrical port 50 has a first connection configuration 70. The second electrical port 52 has a second connection configuration 72. The third electrical port 54 has a third connection configuration 74. The first connection configuration 70, the second connection configuration 72, and the third connection configuration 74 have a same shape. In particular, the first connection configuration 70 has a first electrical connector 80 that is provided in the first receiving bore 60. The first electrical connector 80 includes an insulator body 80*a* and an electrical conductor 80*b* protruding from opposite ends of the insulator body 80*a*. The electrical conductor 80*b* is electrically connected to the battery 20 via the electronic controller 22. Similarly, the second connection configuration 72 has a second electrical connector 82 that is provided in the second receiving bore 62. The second electrical connector 82 includes an insulator body 82*a* and an electrical conductor 82*b* protruding from opposite ends of the insulator body 82*a*. The electrical conductor 82*b* is electrically connected to the battery 20 via the electronic controller 22. The third connection configuration 74 has a third electrical connector 84 that is provided in the third receiving bore 64. The third electrical connector 84 includes an insulator body 84*a* and an electrical conductor 84*b* protruding from opposite ends of the insulator body 82*a*. The electrical conductor 84*b* is electrically connected to the battery 20 via the electronic controller 22. Accordingly, the term "connection configuration" as used herein refers to the structures of the electrical port that allows and/or prevents connections with a mating connector. Here, the first, second and third receiving bores 60, 62 and 64 and the electrical connectors 80, 82 and 84 of the first, second and third electrical ports 50, 52 and 54 have the same connection configurations such that they can each be connected to the same mating electrical connector. In this way, each of the first electrical connectors 42*a*, 44*a* and 46*a* of the first, second and third electrical cables 42, 44 and 46 can be connected to any one of the first, second and third electrical ports 50, 52 and 54.

Figure 7:
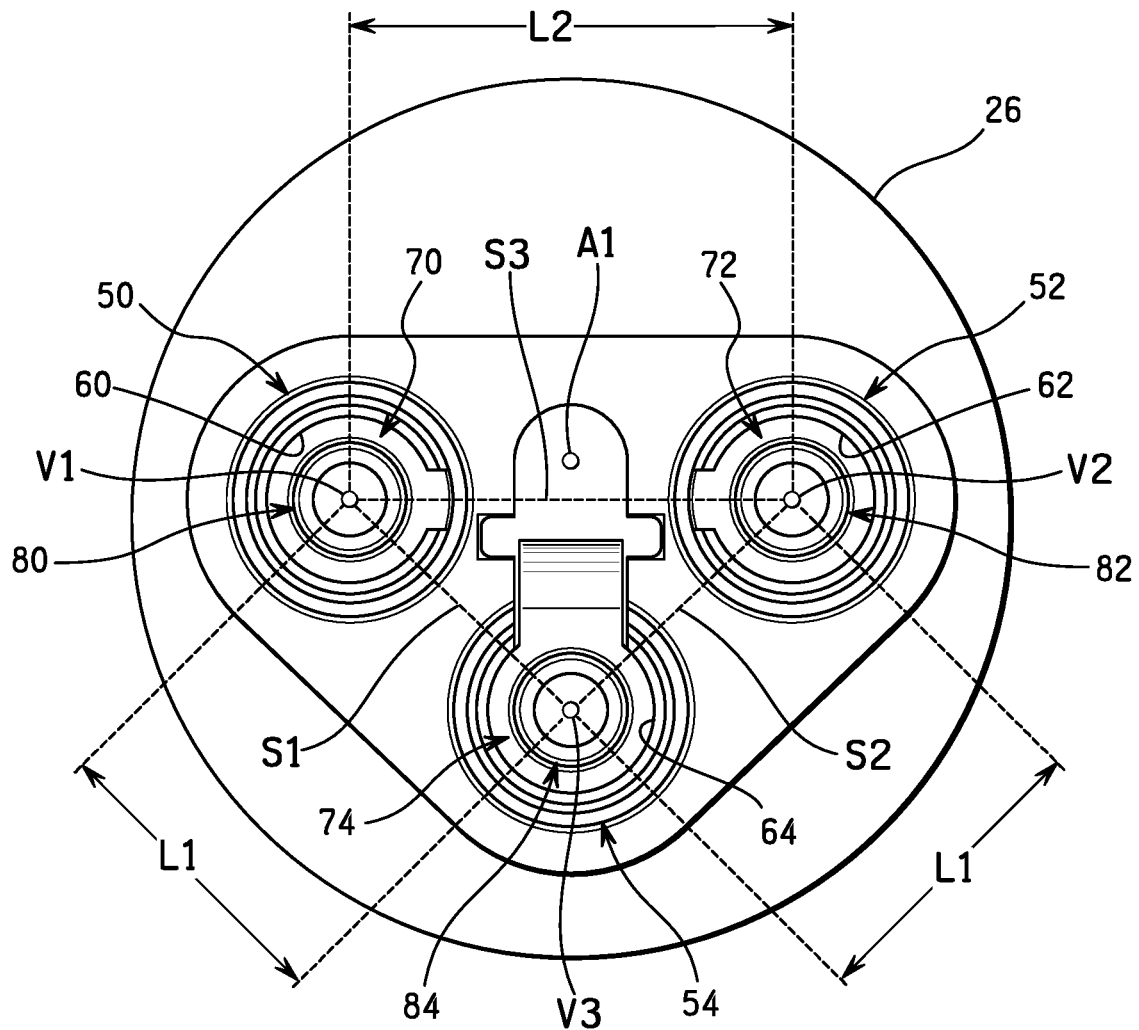
FIG. 7 is an end view of the connection end of the power supply device illustrated in FIGS. 4 to 6.

As seen in FIG. 7, each of the receiving bores 60, 62 and 64 of the first electrical port 50, the second electrical port 52, and the third electrical port 54 has a center axis V1, V2 and V3, respectively, that corresponds to a vertex of a triangle T when viewed from a first direction that is parallel to the longitudinal direction µl of the base 14. Here, the triangle includes a first side S1, a second side S2 and third side S3. The first side S1 and the second side S2 have lengths L1 that are equal. The third side S3 has a length L2 that is different from the length L1 of the first side S1.

Figure 9:
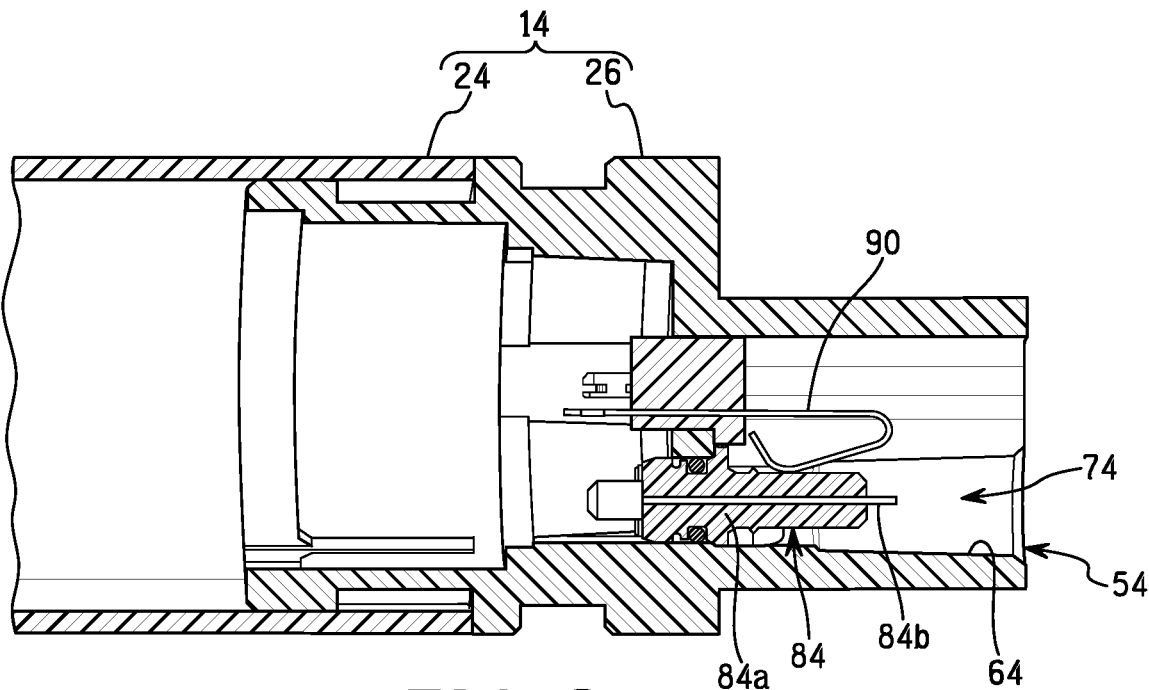
FIG. 9 is a cross sectional view of the connection end of the power supply device as viewed along section line 9-9 in FIG. 7.
Figure 10:
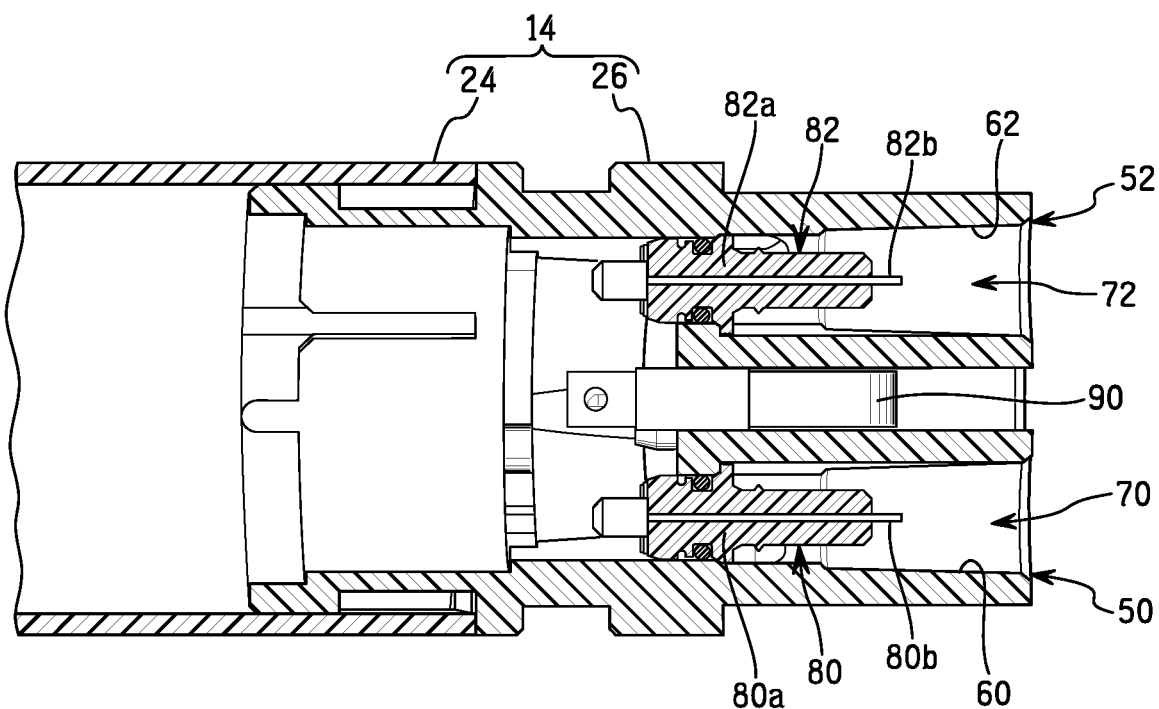
FIG. 10 is a cross sectional view of the connection end of the power supply device as viewed along section line 10-10 in FIG. 7.
Figure 11:
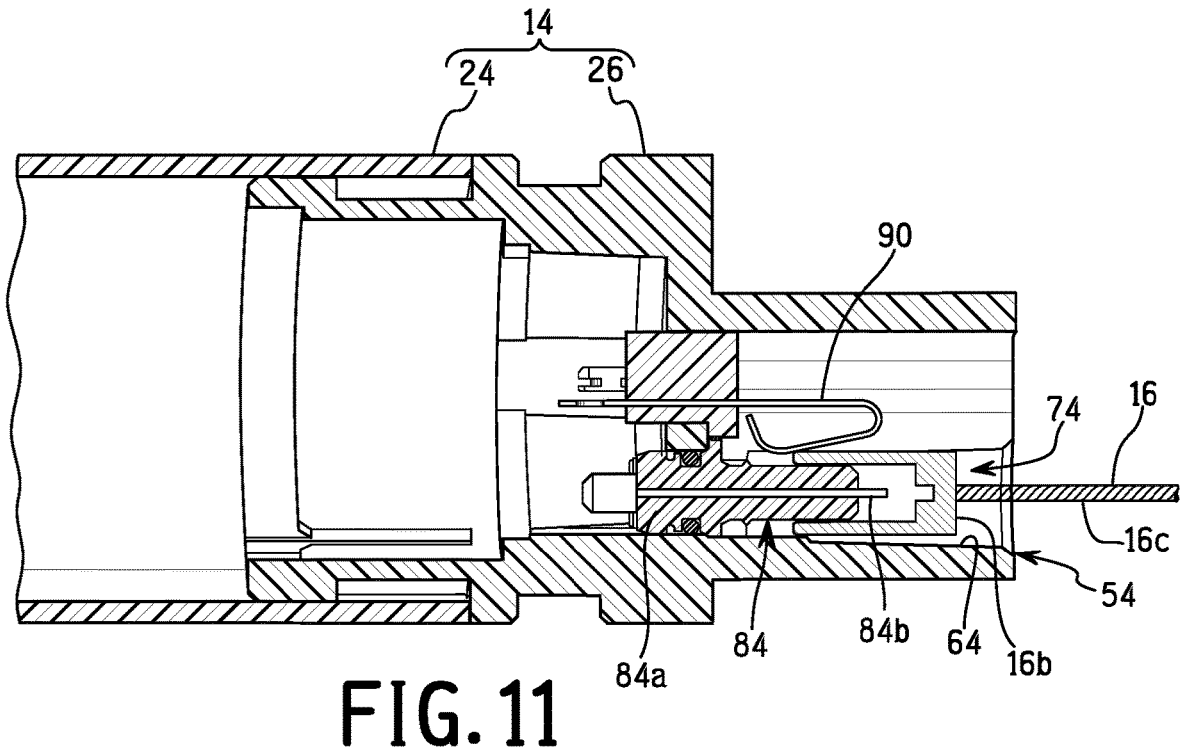
FIG. 11 is a cross sectional view, similar to FIG. 9, of the connection end of the power supply device but with an electrical connector disposed in the third electrical port in a non-electrical connecting position.
Figure 12:
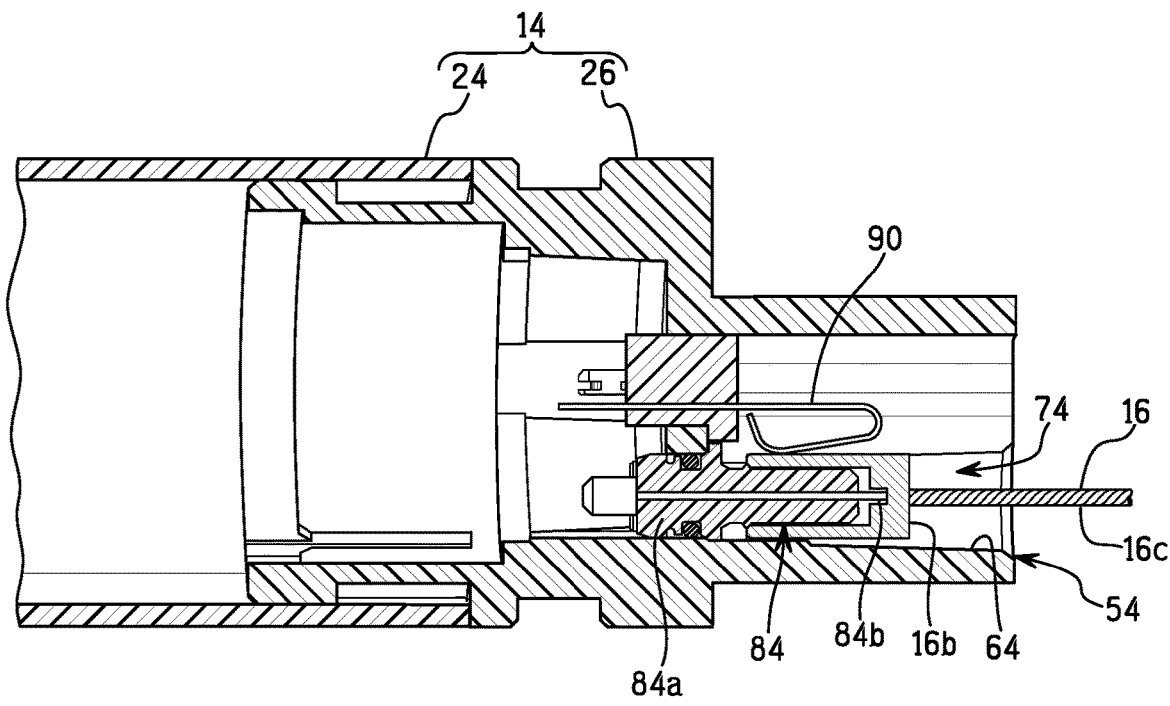
FIG. 12 is a cross sectional view, similar to FIG. 11, of the connection end of the power supply device but with the electrical connector disposed in the third electrical port in an electrical connecting position.

As seen in FIGS. 5 to 12, in the first embodiment, the power supply device 12 further comprises an electrical contact 90 that is provided to the base 14. In particular, the electrical contact 90 is a leaf spring contact that is attached to the end cap 26 of the base 14. The electrical contact 90 is disposed in the bore 66 with a portion of the electrical contact 90 extending into the third receiving bore 64 of the third electrical port 54. The electrical contact 90 is electrically connected to the electronic controller 22. The electrical contact 90 is configured to extend into the third receiving bore 64 of the third electrical port 54 as seen in FIGS. 9 and 10. As seen in FIGS. 11 and 12, the operating member 16 is movably attached to the third electrical port 54. In this configuration, the operating member 16 can be operated to perform a rebooting operation. Alternatively, any one of the first electrical connectors 42*a*, 44*a* and 46*a* of the first, second and third electrical cables 42, 44 and 46 can be connected to the third electrical connector 84 that is disposed in the third receiving bore 64 of the third electrical port 54.

When the third electrical connector 84 is electrical connected to any one of the first electrical connectors 42*a*, 44*a* and 46*a* of the first, second and third electrical cables 42, 44 and 46, the electrical contact 90 is not electrically connected to the electrical conductor 84*b* of the third electrical connector 84 due to the outer insulation of the first electrical connectors 42*a*, 44*a* or 46*a*. However, the operating member 16 has a connector 16*b* that is configured to selectively mate with the first electrical port 50, the second electrical port 52, and the third electrical port 54. The connector 16*b* is made of an electrically conductive material (e.g., metal) When the connector 16*b* of the operating member 16 is disposed in the first receiving bore 60 of the first electrical port 50 or the second receiving bore 62 of the second electrical port 52, the connector 16*b* of the operating member 16 does not make any electrical connection with the electrical contact 90.

However, when the connector 16*b* of the operating member 16 is disposed in the third receiving bore 64 of the third electrical port 54, the connector 16*b* of the operating member 16 will make an electrical connection with the electrical contact 90. When the connector 16*b* of the operating member 16 is pushed in far enough to contact the electrical conductor 84*b* of the third electrical connector 84, an electrical connection is made between the electrical contact 90 and the electrical conductor 84*b* of the third electrical connector 84 via the connector 16*b*. Here, as seen in FIG. 2, the operating member 16 includes a cable 16*c* (a Bowden cable) that has one end connected the connector 16*b* and the other end to the user input 16*a* (e.g., a push button). Thus, depressing the user input 16*a* will move the connector 16*b* from a non-electrical connection position (FIG. 11) to an electrical connection position (FIG. 12). In the electrical connection position (FIG. 12), the reboot circuit 36 is activated to start a rebooting process.

Figure 15:
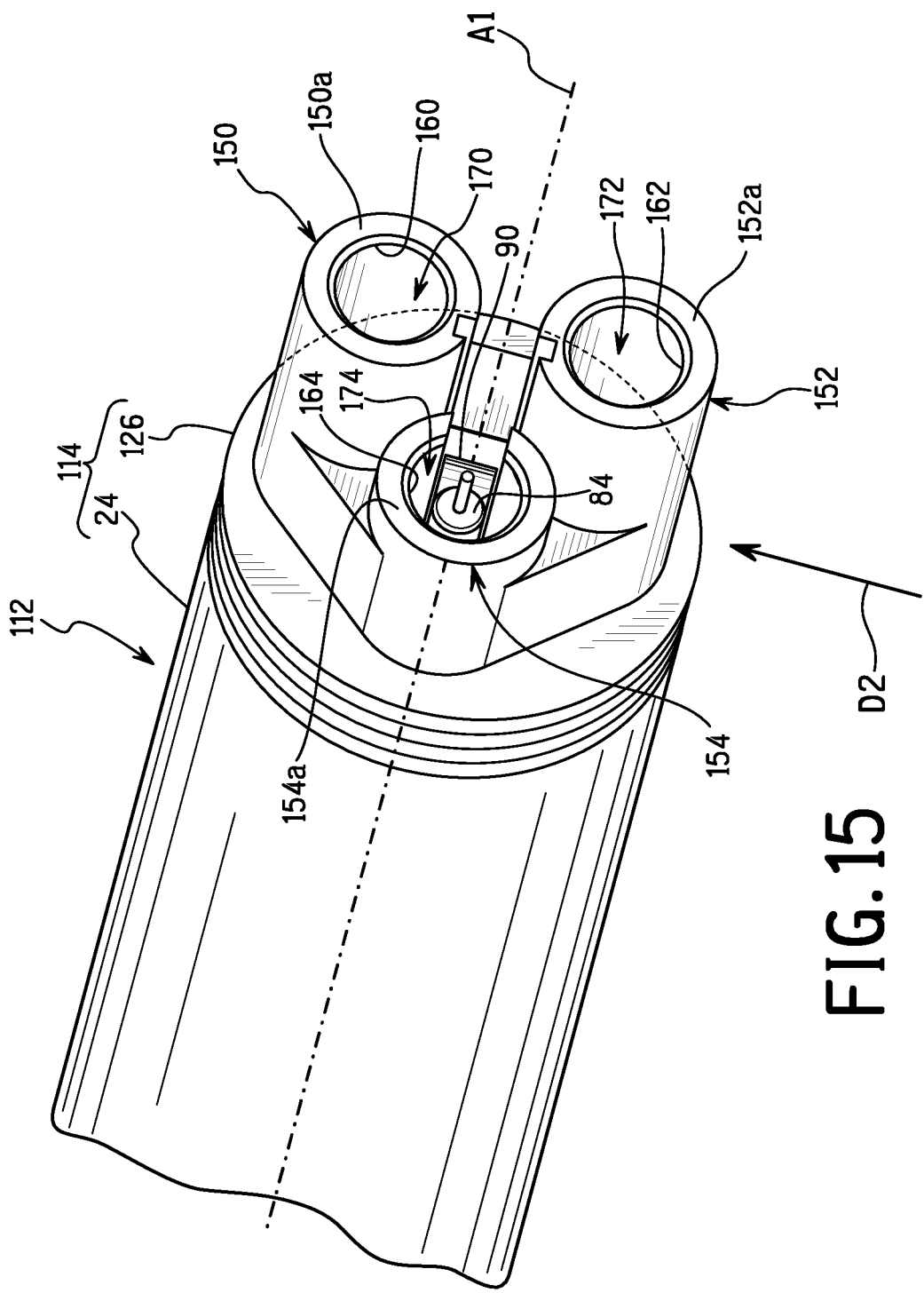
FIG. 15 is a partial perspective view of a power supply device illustrated in FIGS. 13 and 14.

Referring now to FIGS. 13 to 15, a power supply device 112 is illustrated in accordance with a second embodiment. Here, the power supply device 112 is identical to the power supply device 12 except that the end cap 26 of the power supply device 12 has been replaced with an end cap 126. Thus, the power supply device 112 has a base 114 that includes the housing 24 and the end cap 126. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the second embodiment, the end cap 126 of the power supply device 112 further comprises a first electrical port 150, a second electrical port 152 and a third electrical port 154. Here, the power supply device 112 further comprises a discrimination structure 155 that is configured to discriminate the third electrical port 154 from the first electrical port 150 and the second electrical port 152.

In particular, the first electrical port 150 has a first distal end 150*a*, the second electrical port 152 has a second distal end 152*a*, and the third electrical port 154 has a third distal end 154*a*. The third distal end 154*a* is offset from the first and second distal ends 150*a* and 152*a* as viewed in a second direction D2 that is perpendicular to the longitudinal direction µl of the base 114. Thus, the discrimination structure 155 includes a step defined by the third distal end 154*a* and the first and second distal ends 150*a* and 152.

The first and second electrical ports 150 and 152 are basically identical to the first and second electrical ports 50 and 52 of the first embodiment except for their longitudinal lengths. The first electrical port 150 has a first receiving bore 160 with a cylindrical shape that is the same as the first receiving bore 60 of the first embodiment. The second electrical port 152 has a second receiving bore 162 with a cylindrical shape that is the same as the second receiving bore 62 of the first embodiment. The third electrical port 154 is basically identical to the third electrical port 54 of the first embodiment except for its longitudinal lengths. The third electrical port 154 has a third receiving bore 164 with a cylindrical shape similar to the third receiving bore 64 of the first embodiment. Thus, the connection configurations of the first, second and third electrical ports 150, 152 and 154 are the same as the connection configurations of the first, second and third electrical ports 50, 52 and 54 of the first embodiment. Thus, the first electrical port 150 has a first connection configuration 170. The second electrical port 152 has a second connection configuration 172. The third electrical port 154 has a third connection configuration 174. The first, second and third connection configurations 170, 172 and 174 have the same configurations as first, second and third connection configurations 70, 72 and 74 of the first embodiment.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a human-powered vehicle in an upright, riding position and equipped with the power supply device. Accordingly, these directional terms, as utilized to describe the power supply device should be interpreted relative to a human-powered vehicle in an upright riding position on a horizontal surface and that is equipped with the power supply device. The terms "left" and "right" are used to indicate the "right" when referencing from the right side as viewed from the rear of the bicycle, and the "left" when referencing from the left side as viewed from the rear of the bicycle.

The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three.

Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention.

The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A power supply device for a human-powered vehicle, the power supply device comprising:
   a base having a cylindrical body that houses a circuit board;
   a first electrical port provided to the base and electrically connected to the circuit board, and having a first connection configuration;
   a second electrical port provided to the base and electrically connected to the circuit board, and having a second connection configuration; and
   a third electrical port provided to the base and electrically connected to the circuit board, and having a third connection configuration, the first electrical port, the second electrical port and the third electrical port are arranged adjacent to each other on a same end surface of the base,
   the first connection configuration, the second connection configuration, and the third connection configuration having a same shape.

2. The power supply device according to claim 1, further comprising a battery provided to the base; and
an electronic controller provided to the base and operatively connected to the battery.

3. The power supply device according to claim 2, further comprising
an operating member, and
the electronic controller being configured to be rebooted to a predetermined setting upon the operating member being operated.

4. The power supply device according to claim 3, wherein the operating member is movably attached to the third electrical port.

5. The power supply device according to claim 4, wherein the operating member has a connector configured to selectively mate with the first electrical port, the second electrical port, and the third electrical port.

6. The power supply device according to claim 4, wherein the operating member is remotely arranged from the base.

7. The power supply device according to claim 1, wherein the base is configured to be arranged in at least one of a seatpost and an internal space of the human-powered vehicle.

8. The power supply device according to claim 1, wherein the base includes a housing having a pillar shape.

9. A power supply device for a human-powered vehicle, the power supply device comprising:
a base;
a first electrical port provided to the base, and having a first connection configuration;
a second electrical port provided to the base, and having a second connection configuration; and
a third electrical port provided to the base, and having a third connection configuration,
the first connection configuration, the second connection configuration, and the third connection configuration having a same shape, the first electrical port, the second electrical port, and the third electrical port extend from the base in a first direction that is parallel to a longitudinal direction of the base.

10. The power supply device according to claim 9, further comprising
a discrimination structure configured to discriminate the third electrical port from the first electrical port and the second electrical port.

11. The power supply device according to claim 10, wherein
the first electrical port has a first distal end,
the second electrical port has a second distal end,
the third electrical port has a third distal end,
the third distal end is offset from the first and second distal ends as viewed in a second direction that is perpendicular to the longitudinal direction of the base, and
the discrimination structure includes a step defined by the third distal end and the first and second distal ends.

12. A power supply device for a human-powered vehicle, the power supply device comprising:
a base:
a first electrical port provided to the base, and having a first connection configuration;
a second electrical port provided to the base, and having a second connection configuration; and
a third electrical port provided to the base, and having a third connection configuration,
the first connection configuration, the second connection configuration, and the third connection configuration having a same shape, each of the first electrical port, the second electrical port, and the third electrical port has a receiving bore with a cylindrical shape.

13. The power supply device according to claim 12, wherein
each of the receiving bores of the first electrical port, the second electrical port, and the third electrical port has a center axis that corresponds to a vertex of a triangle when viewed from a first direction that is parallel to a longitudinal direction of the base.

14. The power supply device according to claim 13, wherein
the triangle includes a first side, a second side, and third side, and
the first side and the second side have lengths that are equal.

15. The power supply device according to claim 14, wherein
the third side has a length that is different from the length of the first side.

16. The power supply device according to claim 12, wherein
the first electrical port has a first receiving bore that is dimensioned to receive a first electrical cable having a first maximum diameter,
the second electrical port has a second receiving bore that is dimensioned to receive a second electrical cable having a second maximum diameter,
the third electrical port has a third receiving bore that is dimensioned to receive a third electrical cable having a third maximum diameter, and
the first maximum diameter, the second maximum diameter, and the third maximum diameter are equal.

17. The power supply device according to claim 1. further comprising
an indicator configured to indicate information regarding the power supply device.

18. The power supply device according to claim 1, further comprising
a communicator configured to output information regarding the power supply device.

19. The power supply device according to claim 18, wherein
the communicator includes a wireless communication device configured to wirelessly output information regarding the power supply device.

20. The power supply device according to claim 17, wherein
the information including an operational state of the power supply device and an electrical supply capacity of the power supply device.

* * * * *